United States Patent [19]

Gould, III

[11] 3,776,040
[45] Dec. 4, 1973

[54] ELECTRICAL THERMOMETER SYSTEM AND SENSOR THEREFOR

[75] Inventor: Edson B. Gould, III, Newport Beach, Calif.

[73] Assignees: Robert V. Gibson; Thurston H. Ross, Jr., Los Angeles, Calif. ; part interest to each

[22] Filed: Sept. 30, 1971

[21] Appl. No.: 185,280

[52] U.S. Cl. ................ 73/362 AR, 29/612, 337/31, 337/293, 338/25, 338/28, 338/195
[51] Int. Cl. ............................ G01k 7/20, H01c 3/00
[58] Field of Search .................. 73/362 AR; 29/612; 337/293, 297, 31; 338/25, 195, 28; 323/75 H, 75 N

[56] References Cited
UNITED STATES PATENTS

| 3,431,781 | 3/1969 | Wiggin | 73/362 AR |
| 3,478,570 | 11/1969 | Ratnoff | 73/362 AR X |
| 3,469,449 | 9/1969 | Keller | 73/362 AR |
| 3,494,196 | 2/1970 | Moussette | 73/362 AR |
| 3,452,314 | 6/1969 | Sapoff et al. | 29/612 X |
| 3,339,414 | 9/1967 | Coor | 73/362 AR |
| 2,971,379 | 2/1961 | Weisheit | 73/362 AR |
| 3,045,488 | 7/1962 | Jurs et al. | 73/362 AR X |

FOREIGN PATENTS OR APPLICATIONS

| 163,245 | 6/1964 | U.S.S.R. | 338/195 |

Primary Examiner—Richard C. Queisser
Assistant Examiner—Frederick Shoon
Attorney—Angus & Mon

[57] ABSTRACT

An electrical clinical thermometer system including a probe for insertion into a body cavity. A temperature sensor is carried by the probe whose electrical resistance changes with temperature. This probe is connected into a wheatstone bridge circuit which is restored to a balanced condition by an adjustable resistor which is mechanically connected to a readout device that indicates the temperature at the sensor when a meter in the bridge circuit is at its reference setting. The system is insensitive to voltage changes such as from a battery whose voltage declines. The readout device holds its reading when the probe is removed from the cavity, and may be either mechanical or digital. A sensor for this system comprises an elongated metal body with a discontinuity which is bridged by a plurality of fuse-like resistances of different values which can selectively be destroyed so as finely to adjust the resistance of the sensor. Calibration means for the adjustable resistor enable the use of inexpensive, relatively low-tolerance components to secure a very accurate measurement.

12 Claims, 8 Drawing Figures

PATENTED DEC 4 1973
3,776,040
SHEET 1 OF 2
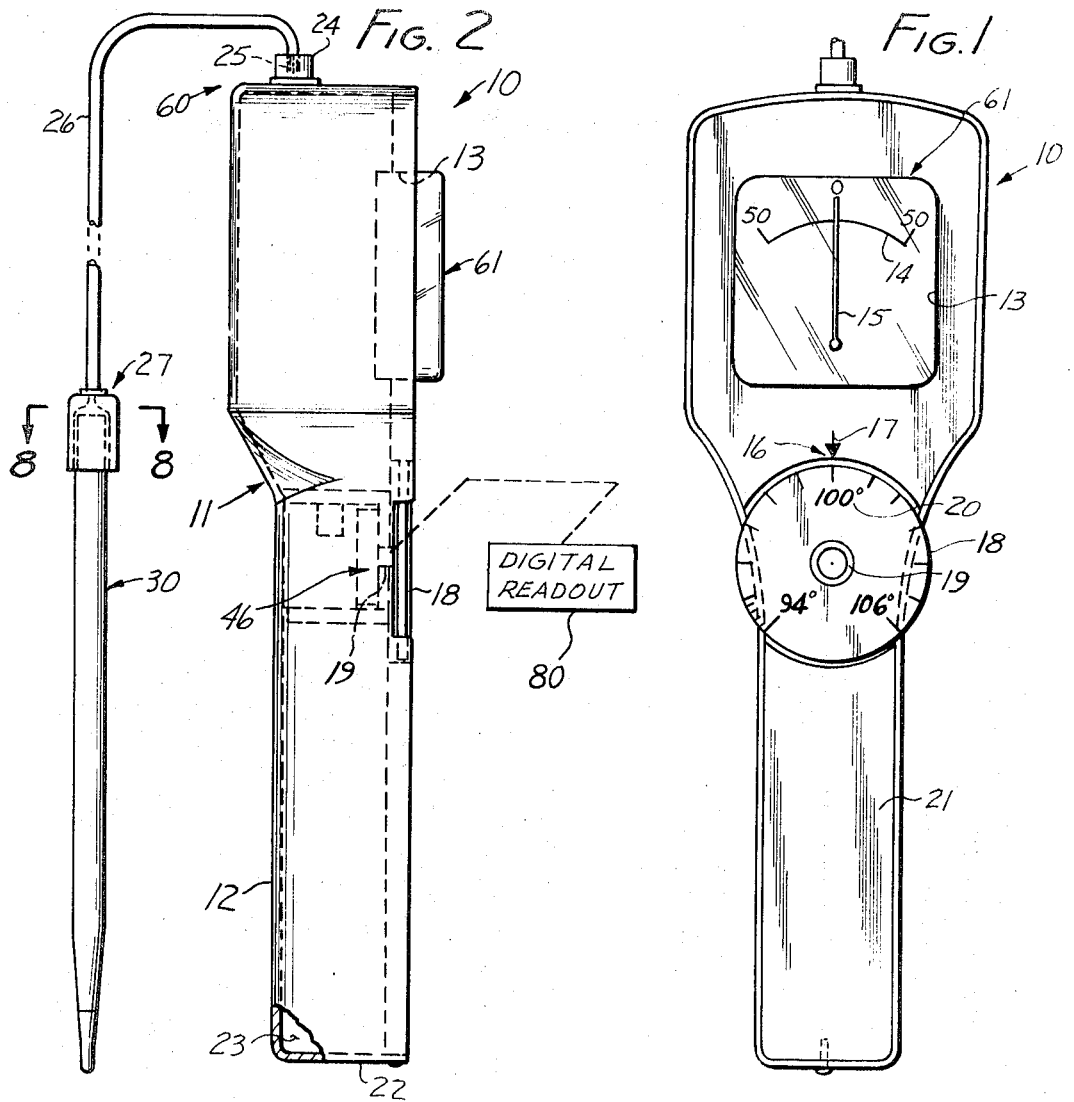
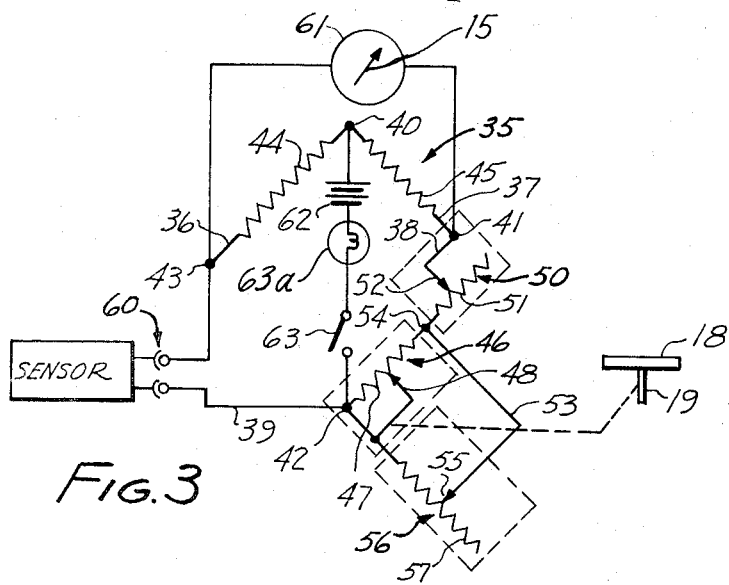
INVENTOR.
EDSON B. GOULD III
BY
ATTORNEYS.

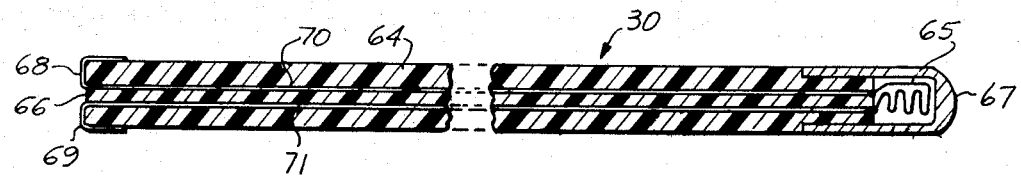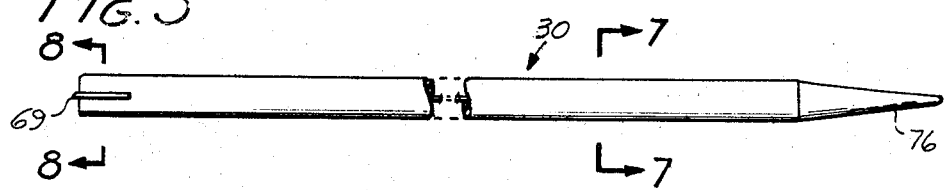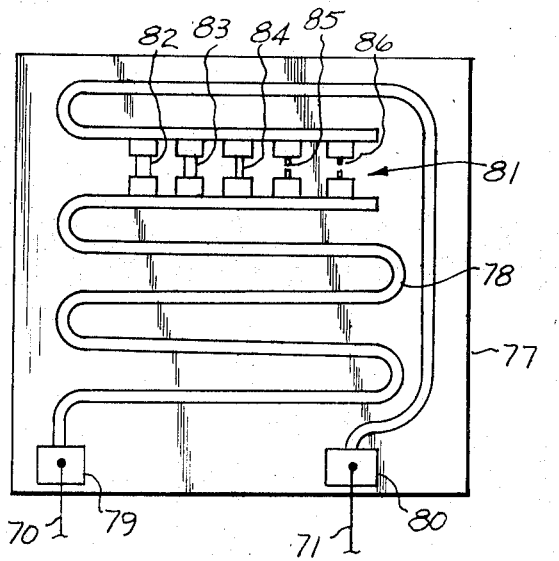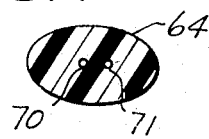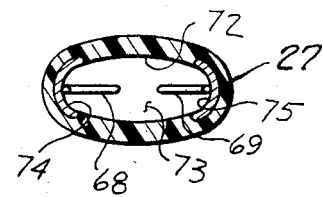

ELECTRICAL THERMOMETER SYSTEM AND SENSOR THEREFOR

This invention relates to an electrical clinical thermometer system, and to a sensor and readout device for use with the same.

Electrical clinical thermometer systems are well known, but all suffer from substantial disadvantages. One of the major disadvantages in the prior art resides in the fact that, in general, their readings are taken by means of a meter which indicates the temperature by a needle pointing at a scale while the probe remains in the mouth. In order for such a meter to have sufficient accuracy, it must have jeweled bearings which contribute greatly to its expense. Even worse, the rough treatment which the device will receive in a hospital soon destroys such a delicate instrument. Furthermore, the temperature reading must be remembered by the attendant because it is lost as soon as the probe is removed from the mouth.

To overcome the foregoing objections, there have been provided a number of means for manually holding the needle at its reading setting, or for providing holding circuitry for the same purpose. Such features are subject to malfunction and increase the expense of the device.

Still another objection to the prior art devices resides in the cost of the thermistors which are used as sensors. Their expense is such that they must be reused, and accordingly, disposable caps are provided to shield the thermistor and to conduct heat to it. This is an inefficient technique, and it also requires the insertion of a previously used probe into a patient's mouth.

It is an object of this invention to provide a clinical thermometer system which can utilize relatively inexpensive circuit components, such as adjustable resistors and meters, which gives a reading which is obtained manually and retained after the sensor is removed from the mouth, the retention of said reading being a consequence of simply leaving the adjustable element as it was, does not require any interaction with the meter or the associated circuitry, and in which the temperature sensor and probe combination is so inexpensive that it can be thrown away after each use.

Still another disadvantage of prior art devices resides in their sensitivity to voltage variations such as can be expected from small batteries with limited capacity and life. The system of this invention performs accurately regardless of the voltage, and is so insensitive to it that it can even provide a light to illuminate its dial from the same battery without affecting the accuracy of the reading.

An electrical clinical thermometer system according to this invention includes a probe for insertion into a body cavity. A temperature sensor is carried by the probe, and has an electrical resistance which changes as a function of temperature. The sensor is incorporated in a wheatstone bridge circuit, another arm of which includes an adjustable resistor which is set by manual means so as to balance a meter in accordance with conventional wheatstone bridge operation. The manual means which sets the adjustable resistor has a portion such as a shaft whose position is indicative of the reading, and which remains in its adjusted position after the probe is removed from the mouth. Readout means (indicia) may be attached directly to this portion and read mechanically, or a digital readout device may be connected to it, as preferred. In both cases the reading is available even after the sensor is removed from the body.

According to a preferred but optional feature of the invention, the sensor comprises an elongated and exposed metal layer.

According to still another preferred but optional feature of the invention, a discontinuity is formed in the sensor which is bridged by a plurality of fuse-like resistances of different values. These can selectively be destroyed in order finely to adjust the resistance of the sensor.

According to another preferred but optional feature of the invention, the adjustable resistance is connected to a first and second calibrating resistance which are provided for setting the maximum and minimum scale readings, thereby permitting the use of adjustable resistors of relatively low precision, and significantly reducing the cost of the unit.

The above and other features of this invention will be fully understood from the following detailed description and the accompanying drawings, in which:

FIG. 1 is a plan view of the presently preferred embodiment of a readout member according to the invention;

FIG. 2 is a right-hand side view of FIG. 1, together with additional portions of the invention;

FIG. 3 is a circuit drawing of the circuitry located within the device shown in FIG. 1;

FIG. 4 is an axial cross-section of the presently preferred embodiment of a sensor and probe for use with this invention;

FIG. 5 is a side view of FIG. 4;

FIG. 6 is an enlarged view of a portion of FIG. 4;

FIG. 7 is a cross-section taken at line 7—7 of FIG. 5; and

FIG. 8 is a section taken at line 8—8 of FIG. 2.

A readout member 10, according to this invention, is shown FIG. 1. This member comprises a case 11 with a handle 12. The case includes an aperture 13 through which a scale 14 and a meter needle 15 are visible.

On the case there is a readout means 16 which comprises a reference mark 17 on the case and a rotatable disc 18 which is rotatably mounted to the case by a shaft 19. Calibration marks 20 in degrees of temperature are printed around the periphery of the rotatable disc, and the coincidence of reference mark 17 with one of the calibration marks 20 is the means for determining the temperature which has been taken.

The case may conveniently be made of a cover 21 and a base member 22, forming a cavity 23 to receive the elements of circuitry as will later be disclosed. The circuitry of FIG. 3 is contained within the cavity 23. Because the circuit components are standard types, they will be shown only by their electrical symbols.

A socket 24 is provided at the top of the base member to receive prongs 25 from a two-wire conductor 26 which extends to a connector 27 to which a probe 30 is connected. The conductor can readily be connected and disconnected from the case by removing the prongs from the socket.

A wheatstone bridge circuit 35 is provided which has first, second, third and fourth arms 36, 37, 38 and 39, respective- 16, in a hollow square configuration. These arms are connected at first, second, third and fourth terminals 40, 41, 42 and 43, respectively. First resistor 44 is connected between the first and fourth terminals 40 and 43. Second resistor 45 is connected between first and second terminals 40 and 41, respectively. Resistors 44 and 45 have equal values in accordance with known wheatstone bridge construction.

An adjustable resistor 46 is connected to the second and third terminals 41 and 42, respectively. The term "adjustable resistor" is used herein in its generic form to describe any circuit device whose contribution to the resistance of its respective arm is adjustable. In its most common form, it has an elongated resistance, such as a winding 47, and an adjustable contact 48 slidable along the winding to determine that portion of the winding which is included in the circuit. The location of the contact along the winding will thereby adjustably determine the resistance in the respective arm. In the simplest embodiment of the invention, one end of the winding would be connected to one of terminals 41 and 42, and the slider to the other. However, a more sophisticated circuit is shown for the third arm which enables less expensive circuit components to be used in the construction of this device. For this purpose, a first adjustable calibration resistor 50, having a winding 51 and a contact 52, is connected between the adjustable resistor and terminal 41. A tap 53 connects at a terminal 54 and extends to the contact 55 of a second adjustable calibration resistor 56, which has a winding 57. This winding is also connected to the contact 48 of the adjustable resistor 46.

The fourth arm 39 incorporates connector means 60 which constitute the socket 24. The connector means is connected to third and fourth terminals 42 and 43, respectively. It will now be seen that the sensor can be connected at the connector means 60 into the fourth arm of the wheatstone bridge circuit.

A meter 61 is connected to the second and fourth terminals 41 and 43, respectively. This meter includes needle 15. It is of the type which balances at a central portion of the scale in the absence of current flow through it. Its needle deflects right or left as a consequence of current flow through the meter. This is a rugged and inexpensive meter, and has only one reading of importance — its null position. Readings along the scale off-center are unnecessary. The meter case fits in aperture 13.

A voltage source 62 such as a battery is connected to first and third terminals 40 and 42, respectively. If desired, an off-on switch 63 may be connected between the battery and one of terminals 40 or 42. In the preferred embodiment of this invention, a common radio off-on and volume-control device is utilized. It includes a switch actuated by its shaft, as well as contact 48, which is moved along the winding by rotation of the shaft. This is schematically shown in FIG. 2. The classical construction is that of a cam on the rotatable shaft 19 adapted to open and close switch 63, with the contact mounted to the shaft to move along winding 47, which winding is usually arcuate.

A light 63a may be connected in series with the battery and switch so as to be turned on along with the meter, whereby to illuminate the dial. The system is insensitive to voltage variation, and the light does not upset its accuracy.

Probe 30 comprises an elongated body 64, which is intended to be thrown away after each use. It carries the sensor 65, which also is intended to be thrown away after every use, or after the respective patient has finished with it after a number of uses.

It is a significant advantage of this invention that the sensor can be made inexpensively enough that it can be thrown away, thereby to avoid the problems of contamination. The probe is best shown in FIG. 4. Its body 64 has first and second ends 66, 67. At the first end, terminal ends 68, 69 of leads 70, 71 are exposed and folded over the end to fit against the outside wall of the body. These terminal ends form conductive connections at a socket 72, which forms part of connector 27.

FIG. 8 shows the open end of the socket with a cavity 73. It has a generally ovular section, which also is the general shape of the probe. This arrangement aligns the connecting elements at this connector. A pair of exposed arcuate plates 74, 75 in this cavity are borne against by the terminal ends 68 and 69 so as to make conductive contact at connector 27. The ends of the leads are preferably so fragile that, while they can readily be shoved into the socket, upon removal they are apt to be frayed and torn, thereby rendering the probe unsuitable for a second usage. Should the probe be intended for more than one usage, then these terminal ends will be made sufficiently strong that they will not be destroyed by the removal process, or will simply be kept assembled with the same conductor 26.

Sensor 65 is placed in an opening at the second end 67 of the probe. It is exposed to fluids in the body cavity.

The sensor may readily be manufactured by thin film deposition techniques, "thick film" screening techniques, or by circuit-board techniques, as preferred. The sensor includes a base member 77, upon which is deposited, or otherwise applied, and an elongated metal member 78, preferably in the form of a deposited layer. The member terminates at a pair of terminal patches 79, 80, to which leads 70 and 71 are conductively attached. Even though gold is the preferred material of construction for the thermally sensitive portion of the sensor, so little of it is required that the device remains commercially practical and low in cost. A gold layer approximately 200 angstroms thick is the preferred material for member 78.

In order to provide for sufficient resistance in the small area, the layer is preferably made serpentine in shape, and has a discontinuity 81 which is bridged by a plurality of fuse-like resistance elements 82, 83, 84, 85, 86, whose widths differ from one another by various increments. It is possible to standardize the resistance of the sensor so as to produce sensors of great accuracy with mass production techniques by applying current pulses of such value as to "blow" these fuse-like resistance elements in whatever combination is required to leave behind only those bridges which will result in a sensor of the desired resistance at a given temperature. Accordingly, a fine tuning of the resistance is possible simply by heating the sensor to a desired standard temperature, and then, by applying pulses of appropriate magnitude, blowing such of these fuses as is necessary in order to give the layer the necessary resistance at the given temperature. This is an inexpensive and rapid procedure, and results in a very inexpensive and highly accurate sensor.

The surface of the metal member 78 is readily sterilized, and will not be adversely affected by body fluids. The layer is tough and resistant to the abrasion it is likely to encounter. If desired, however, a protective coating may be applied over the layer, although this will not ordinarily be necessary. Further, if desired, the sensor may be somewhat recessed in the opening in order to give a measure of mechanical protection to member 78.

Gold is the preferred metal for making member 78 because of its favorable relationship between temperature and resistance, especially in thin films. Other materials exhibiting similar resistance-temperature properties, both metallic and non-metallic, may be used instead. Preferably, one will be selected which is readily applied. Standard thermistors may also be used, sacrificing, however, the economic benefits of the sensor described above.

To calibrate the readout member, a standard resistor having the resistance of the sensor at its highest measurement temperature, say 106°, is connected to connector 60. Adjustable resistor 54 is set toward its "zero" resistance with the indicia for 106° adjacent to reference mark 17. First calibration resistor 50 is adjusted so as to return the meter to null. The upper scale limit is now established.

Next, a standard resistor having the resistance of the sensor at its lowest measurement temperature, say 94°, is connected to connector 60. Adjustable resistor is set toward its maximum resistance, with the indicia for 94° adjacent to reference mark 17, and second calibration resistor 56 is adjusted so as to return the meter to null. The lower scale limit is now established.

Note particularly that the readout member is now closely calibrated to the ends of its scale, and an adjustable resistor, having relatively broad tolerances, such as about 1–2 percent deviation from linearity, can be used. This constitutes a very important savings, because the two calibration resistors can also be made to wide tolerances. There results a device with very high accuracy made from commercial parts of transistor-radio quality.

The device is now ready to be used, and further calibration of resistors 50 and 56 will not be required. Accordingly, their means for adjustment will be enclosed within the case so that they cannot be tampered with. The means for setting the adjustable resistor 46 is connected to shaft 19 which projects through the case. To use the system, the probe is inserted into socket 72, and conductor 26 is joined into the circuit at socket 24. Then, when the probe is inserted into the body cavity, if the resistance of resistor 46 is not already set exactly where it should be to balance out the meter, the disc is turned until the meter is restored to its balanced position, adjusting the resistance of adjustable resistor 46 in so doing. When the needle is set at its balanced point, such as "zero" in FIG. 1, it is known that the temperature has been measured. The probe may then be removed from the cavity. The temperature reading is retained because there is no further need to turn the rotatable disc. It simply remains set, and the reading can be copied by the attendant at a later time or at a place removed from the patient.

The rotational position of shaft 19 is the source of the readout data. It is evident that the simplest readout means is that shown — a dial on the shaft. However, there may instead be provided many equivalents which fall within the scope of the invention. For example, rotary to axial indicators such as a spur gear on the shaft driving a slide along a scale. Such is an example of a mechanical equivalent.

FIG. 2 also shows an electronic equivalent, wherein an electronic digital readout device 80 is controlled by shaft 19. In such a device, shaft 19 would drive a potentiometer (not shown), whose output is converted by the digital readout to a legible numerical array in accordance with known principles that form no part of this invention. It does indicate the wide range of read-out means available to this system.

This device can utilize an extremely rugged and tough meter, because it is not necessary for it to be read to graduations extending over an entire scale. Instead, it is only necessary for this meter to be read at a single null condition. Accordingly, rugged meters, which do not have to use jeweled bearings, can be utilized, and the cost of the device is greatly reduced.

This invention thereby provides an inexpensive readout device and an inexpensive probe, both of which can readily be produced to high tolerances from inexpensive components and with economical manufacturing techniques, thereby to provide a readout means which does not require the use of memory by the attendant or complicated means for holding meter readings or circuit settings.

Because the system is a balanced one, the voltage across terminals 40 and 42 is immaterial to the measurement of the temperature. Therefore the condition of the battery is unimportant to the accuracy of the instrument, which constitutes an important advance in this art.

This invention is not to be limited by the embodiments shown in the drawings and described in the description, which are given by way of example and not of limitation, but only in accordance with the scope of the appended claims.

I claim:

1. An electrical clinical thermometer system comprising: a probe for insertion into a body cavity; a temperature sensor carried by the probe and having an electrical resistance which changes as a function of temperature, said sensor comprising an elongated metal layer, there being a discontinuity in the said layer which is initially bridged by a plurality of fuse-like resistances of different resistance values, whereby an adjustment of the resistance value of the sensor can be made by destroying the continuity of selected ones of said fuse-like resistances, there remaining in place and bridging the discontinuity at least one of said fuse-like resistances; a wheatstone bridge circuit having four arms joined in a hollow square at four terminals; a first and a second resistor connected in a first and a second one of said arms, connected to each other at the first of said terminals, said first and second resistors being of equal value; an adjustable resistor in a third of said arms connected at the second of said terminals with said second resistor, and also connected to the third of said terminals; connector means connected to said adjustable resistor at said third terminal and to the first of said resistors at the fourth of said terminals, said connector means being adapted to connect said sensor into the fourth arm; a voltage source connected to the first and third terminals; a meter connected to said second and fourth terminals; and readout means calibrated in degrees of temperature whose reading is determined by the value of the resistance required in the third arm in order to balance that of the sensor, and thereby to set the meter to a balanced setting.

2. A thermometer system according to claim 1 in which the sensor comprises an elongated and exposed metal layer.

3. A thermometer system according to claim 2 in which the metal of the layer is gold.

4. A thermometer system according to claim 1 in which a switch is connected between the voltage source and one of the first and third terminals.

5. A thermometer system according to claim 1 in which the third of said arms further includes a first and a second calibration resistor for setting the resistances in said third arm respective to sensor resistances respective to maximum and mimimum temperatures to be measured.

6. A thermometer system according to claim 5 in which the first calibration resistor is serially connected to the adjustable resistor and to the second terminal, the second calibration resistor is connected to the first calibration resistor and to the adjustable resistor at their mutual connection, and to an adjustable portion of said adjustable resistor.

7. A thermometer system according to claim 1 in which the resistance of the adjustable resistor is set by manual means, and in which the readout means comprises visual calibration carried by said manual means.

8. A thermometer system according to claim 7 in which the said manual means is a rotatable member mounted to a rotatable shaft which sets the adjustable resistor.

9. A system according to claim 1 in which said means calibrated in degrees of temperature is a digital readout.

10. A thermometer system according to claim 1 in which a lamp is connected in circuitry between the first and third terminals.

11. A sensor for an electrical thermometer comprising: a base, and an elongated layer of metal on and adherent to said base, said metal having the property of changing resistance with temperature, there being a discontinuity in the said layer which is initially bridged by a plurality of fuse-like resistances of different resistance values, whereby an adjustment of the resistance value of the sensor can be made by destroying the continuity of selected ones of said fuse-like resistances, there remaining in place and bridging the discontinuity at least one of said fuse-like resistances.

12. A sensor according to claim 11 in which the metal of the layer is gold.

* * * * *